United States Patent Office 3,197,521
Patented July 27, 1965

3,197,521
PROCESS FOR REMOVING ACID-FORMING HYDROGEN-CONTAINING COMPOUNDS IN AN ALKYLATION PROCESS
Vladimir Haensel, Hinsdale, Ill., assignor to Universal Oil Products Company, Des Plaines, Ill., a corporation of Delaware
No Drawing. Filed May 21, 1962, Ser. No. 196,480
10 Claims. (Cl. 260—671)

This invention relates to a process for the removal of hydrogen values from a reaction atmosphere, and more particularly relates to the removal of hydrogen values which tend to accumulate in a reaction atmosphere by reacting these hydrogen values with a hydrogen value removal agent.

It has been found that in the production of alkylated aromatic hydrocarbons utilizing a boron trifluoride-modified substantially anhydrous inorganic oxide catalyst, alkylatable aromatic compound, olefin-acting compound, and boron trifluoride, difficulties are encountered with respect to the participation of water in the reaction between boron trifluoride and the inorganic oxide catalyst. It appears that water acts in a dual role; the first being that of suppressing the catalyst activity, thus necessitating addition of much larger amounts of boron trifluoride and the second, the hastening of the reaction between boron trifluoride and the inorganic oxide catalyst to form the metal fluoride and various boron oxides.

I have found that it is the "hydrogen values" which are present in the various "reaction atmospheres" that are responsible for this difficulty. By way of definition and for the purpose of illustration only with no intention of unduly limiting the generally broad scope of this invention, the term "hydrogen values" means compounds containing hydrogen which can react to form acidic materials. The term "reaction atmospheres" shall include reactors, fractionating columns, separators, mass transfer devices, heat transfer devices, filters, pumps, fluid treating devices, and the like.

The principal object of the present invention is to provide a process for the efficient and economical conversion of hydrogen values in reaction atmospheres such as hereinabove mentioned to molecular hydrogen. These reaction atmospheres may include the presence of gaseous or liquid compounds, such as an aromatic hydrocarbon comprising benzene, or higher homologs of benzene, olefin-acting compounds which are normally gaseous such as ethylene, and mixtures thereof as hereinafter described. The reaction atmosphere may be of a substantially anhydrous nature inasmuch as the effect of water would be detrimental to the desired reaction. Another object of this invention is to provide a process whereby the hydrogen values can be removed continuously from the hereinabove mentioned reaction atmospheres and, if desired, may be liberated without appreciable consumption and loss of other chemicals. Other objects of this invention will be set forth hereinafter as part of the specification and in the accompanying examples.

In one embodiment, the present invention relates to a process for removing hydrogen values from a reaction atmosphere containing the same which comprises reacting said hydrogen values with a hydrogen value removal agent and thereby converting said hydrogen values to molecular hydrogen.

Another embodiment of the present invention relates to a process for removing hydrogen values from a substantially anhydrous reaction atmosphere maintained at a temperature of from about 0° to about 300° C. or higher and a pressure of from about atmospheric to about 200 atmospheres or more and containing said hydrogen values which comprises reacting said hydrogen values with a hydrogen value removal agent and thereby converting said hydrogen values to molecular hydrogen.

A further embodiment of the present invention relates to a process for removing hydrogen values in the presence of a substantially anhydrous fluid from a substantially anhydrous reaction atmosphere maintained at a temperature of from about 0° to about 300° C. or higher and a pressure of from about atmospheric to about 200 atmospheres or more and containing said hydrogen values which comprises reacting said hydrogen values with a hydrogen value removal agent and thereby converting said hydrogen values to molecular hydrogen.

A specific embodiment of this invention relates to a process for removing hydrogen values in the presence of a substantially anhydrous fluid such as substantially anhydrous alkylatable aromatic hydrocarbon and/or substantially anhydrous olefinic hydrocarbon from a substantially anhydrous reaction atmosphere maintained at a temperature of from about 0° to about 300° C. or higher and a pressure of from about atmospheric to about 200 atmospheres or more and containing said hydrogen values which comprises reacting said hydrogen values with a hydrogen value removal agent comprising aluminum and thereby converting said hydrogen values to molecular hydrogen.

Other embodiments of the present invention will become apparent in considering the specification as hereinafter set forth.

As set forth hereinabove, the present invention relates to a process for removing hydrogen values from a reaction atmosphere containing the same utilizing a hydrogen value removal agent as the reacting agent. In the present invention, recognized hydrogen values include those that are present in $H_2O$, HF and $HBF_4$. In addition, there are a number of other equilibrated hydrogen values in compounds, such as, $HBF_3OH$, $$HBF_2(OH)_2$$

as well as $H_3BO_3$, etc. It will be appreciated by those skilled in the art that the foregoing list of compounds has by no means exhausted the total number of compounds that may form acidic materials reversibly when water and boron halide are present in a fluid process stream. These acidic materials are also sometimes encountered in combination with each other, with water, or with boron trifluoride, as well as by themselves. Such enumerations are intended to be exemplary only and not limiting to the broad scope of the present invention.

Typical metals utilizable as reaction agents in the process of this invention include aluminum, aluminum amalgamated with a mercury promoter, zinc, magnesium, iron and chromium. Of the above-mentioned metals, aluminum and aluminum amalgamated with a mercury promoter are especially preferred for removing the hydrogen values from the reaction atmosphere utilizing the process of the present invention.

When the reaction agent utilized is aluminum amalgamated with a mercury promoter, the amount of the mercury promoter will usually be within the range of from about 0.05% to about 50% by weight of the aluminum. The mercury promoter is selected from the following group and may be a mixture of two or more of these mercury promoters; mercury, mercuric acetate, mercurous acetate, mercuric bromate, mercurous bromate, mercuric bromide, mercurous bromide, mercuric bromide iodide, mercurous carbonate, mercuric chloride, mercurous chloride, mercuric fluoride, mercurous fluoride, mercuric idodide, mercurous iodide, mercuric nitrate, mercurous nitrate, mercuric oxalate, mercuric oxide, mercurous oxide, mercuric sulfate, mercurous sulfate, etc., as well as mercury-nitrogen compounds such as ammono-basic mercuric bromide, ammono-basic mercuric chloride, etc. Almost any other mercury-containing compound may be used and it may be a mercuric salt or mercurous salt, either organic or inorganic, an oxide of mercury, or a complex of mercury compounds.

As hereinbefore set forth, these reaction atmospheres may include the presence of a substantially anhydrous fluid. These fluid mixtures would include, for example, such components as hydrogen, methane, ethane, propane, inert gases, boron halides, etc. There may also be present alkylatable aromatic compound in the reaction atmospheres. Typical alkylatable aromatic compounds are the alkylatable aromatic hydrocarbons and the preferred alkylatable aromatic hydrocarbons are monocyclic hydrocarbons, that is, benzene hydrocarbons. Suitable aromatic hydrocarbons include benzene, toluene, and other alkyl benzenes or mixtures thereof. Higher molecular weight alkyl aromatic hydrocarbons are also suitable. These include those aromatic hydrocarbons such as are produced by the alkylation of aromatic hydrocarbons with olefin polymers and are used as intermediates in the preparation of sulfonate surface-active agents. Such products are frequently referred to in the art as alkylate, and include hexylbenzenes, nonylbenzenes, dodecylbenzenes, pentadecylbenzenes, hexyltoluenes, nonyltoluenes, dodecyltoluenes, pentadecyltoluenes, etc. or mixtures thereof. Very often alkylate is obtained as a high boiling fraction with the alkyl group attached to the aromatic nuclus various in size from about $C_9$ to $C_{18}$. Other suitable aromatic hydrocarbons, which at specified reaction conditions, depending upon the melting point of the aromatic chosen, would be in liquid form, would include those aromatic hydrocarbons with 2 or more aryl groups such as diphenyl, diphenyl methane and other polycyclic aromatics. Examples of other aromatic hydrocarbons within the scope of this invention which at specified reaction conditions depending upon the melting point of the aromatic chosen would be in liquid form, include those containing condensed aromatic rings. These include naphthalene, alkylnaphthalenes, anthracene, phenanthrene, naphthacene, rubrene, et. Of the above-mentioned aromatic hydrocarbons that may be found in the reaction atmospheres, benzene itself is particularly preferred in the reaction atmosphere.

In addition, olefin-acting compounds may be found in the reaction atmosphere. Olefin hydrocarbons, particularly normally gaseous hydrocarbons, are olefin-acting compounds for use in the process of this invention. The normally gaseous olefin for use in the process of this invention need not be concentrated. Such normally gaseous olefin hydrocarbons appear in minor quantities in various refinery gas streams usually diluted with gases such as hydrogen, nitrogen, methane, ethane, propane, etc. The olefin-acting compound, particularly olefin hydrocarbon which may be present in the reaction atmosphere includes diverse materials including monoolefins, diolefins, polyolefins, acetylenic hydrocarbons, and also alcohols, ethers, and esters, the latter including alkyl halides, alkyl sulfates, alkyl phosphates, and various esters of carboxylic acids. The preferred olefin-acting compounds are olefinic hydrocarbons which comprise monoolefins containing one double bond per molecule and polyolefins which contain more than one double bond per molecule. Monoolefins which are utilized as olefin-acting compounds in the process of the present invention are either normally gaseous or normally liquid and include ethylene, propylene, 1-butene, 2-butene, isobutylene, and higher molecular weight normally liquid olefins such as various pentenes, hexenes, heptenes, octenes and mixtures thereof, and still higher molecular weight liquid olefins, the latter including various olefin polymers having from about 9 to about 18 carbon atoms per molecule including propylene trimer, propylene tetramer, propylene pentamer, etc. Cycloolefins such as cyclopentene, methylcyclopentene, cyclohexene, methylcyclohexene, etc. may also be found in the reaction atmosphere. Also included within the scope of the olefin-acting compound are certain substances capable of producing olefinic hydrocarbons or intermediates thereof under the conditions of operation utilized in the process. Typical olefin-producing substances or olefin-acting compounds capable of use include alkyl halides capable of undergoing dehydrohalogenation to form olefinic hydrocarbons and thus containing a least 2 carbon atoms per molecule. Examples of such alkyl halides include ethyl fluoride, n-propyl fluoride, isopropyl fluoride, n-butyl fluoride, isobutyl fluoride, sec-butyl fluoride, tert-butyl fluoride, etc., ethyl chloride, n-propyl chloride, isopropyl chloride, n-butyl chloride, isobutyl chloride, etc., ethyl bromide, n-propyl bromide, isopropyl bromide, n-butyl bromide, isobutyl bromide, etc. As stated hereinabove, other esters such as alkyl sulfates including ethyl sulfate, propyl sulfate, etc., and alkyl phosphates including ethyl phosphate, etc., may be also found in the reaction atmosphere. Ethers such as diethyl ether, ethyl propyl ether, dipropyl ether, etc., are also included within the generally broad scope of the term olefin-acting compound and may be found in the reaction atmospheres.

In accordance with the process of the present invention, the removal of hydrogen values from a substantially anhydrous reaction atmosphere containing the same is effected in the presence of a hydrogen value removal agent at a temperature of from about 0° to about 300° C. or higher, and a pressure of from about atmospheric to about 200 atmospheres or more, although the exact temperature and pressure needed will depend upon the particular reaction desired in the reaction atmosphere.

The hydrogen values, at the hereinabove mentioned reaction conditions, reacts with the hydrogen value removal agent in such manner that the hydrogen values are converted to molecular hydrogen and liberated from the reaction atmosphere. In removing hydrogen values to effect efficient operation of the reaction atmosphere thereof with the type of reacting or removal media herein described, either batch or continuous operations may be employed. The actual operation of the process may either be upflow or downflow. The metal reaction agents may be utilized in the form of granules, grains, powders, particles, spheres, balls, tubular shapes, etc. The hydrogen value removal agents can be used as such or dispersed on a suitable carrier; furthermore, the hydrogen value removal agents can be located in the reaction zone either at the entrance point or dispersed throughout the entire reaction atmosphere. The details of processes of this general character are familiar to those skilled in the art and any necessary additions or modifications of the above general procedures will be more or less obvious and can be made without departing from the broad scope of this invention.

The process of this invention is illustrated by the following examples which are introduced for the purpose of illustration and with no intention of unduly limiting the generally broad scope of the invention.

*Example I*

This example illustrates the effect of the formation of acidic materials during the production of alkylated aromatics. The processing unit consisted of liquid and gas charge pumps, reactors, high pressure gas separators, pressure controllers, boron fluoride treating system, feed pretreating system, fractionating columns, and liquid and gas collection systems. The catalyst charged to the reactors comprised a boron fluoride-modified substantially anhydrous inorganic oxide, namely boron trifluoride-modified alumina. The unit was started up according to standard procedures so that ethylbenzene was produced. Substantially pure boron trifluoride was charged to the unit in sufficient quantity along with substantially anhydrous benzene and ethylene so that the benzene was converted to ethylbenzene. Additional boron trifluoride was added as needed to maintain good conversion. Operating temperatures were held at a minimum consistent with good conversion. The operating pressure was selected so that the benzene was kept subtsantially in the liquid phase. The aromatic to olefin ratio was kept at a maximum at all times consistent with the equipment limitations, in order to insure low polyethylbenzene production. The fractionation section first separated part of the benzene recycled by flash and then the remainder by fractionation. The maximum recycle possible was flashed because of the lower heat requirement for flashing until the ethylbenzene and heavier products present became a contamination factor. Most of the boron fluoride was in the effluent vapors. Part of this boron fluoride was condensed with the benzene recycle and returned to the reactor. The remaining boron fluoride passed into the boron fluoride treating system where it was absorbed and returned to the reactor by compressor after being stripped from the absorbent. The liquid from the hot flash was sent to the benzene fractionating column where after removal of the remaining recycle benzene in the benzene column, the ethylbenzene and heavier products were fractionated into an ethylbenzene cut in the overhead of the ethylbenzene column and a bottom cut. The overhead was sent to storage. The fractionator bottoms were recycled back to a second reactor where the polyethylbenzenes were transalkylated to produce ethylbenzene.

During the production of the ethylbenzene in the hereinabove outlined process flow scheme, it was observed that the hydrogen values, that is, those compounds containing hydrogen which can react to form acidic materials, tended to form and accumulate in the various reaction atmospheres. The overall efficiency of the alkylation process decreased as the concentration of these acidic materials became higher. Continued formation of these products caused the eventual shut down of the plant.

*Example II*

This example illustrates the substantial removal of the hydrogen values during the production of an alkylated aromatic compound. The same processing unit described in Example I was utilized for the experiment described in this example.

The process flow scheme was modified so that a chamber containing aluminum chips of 99.9+% purity was introduced before the inlet of the alkylation reactor. The chamber, or pretreatment vessel, containing this material was predried before use by purging with dry nitrogen at 200° C. for 4 hours at 5 s.c.f./hour. The chamber was then operated at 200° C. and 500 p.s.i.g A sampling system was set up to test the accuracy of the analytical procedures by means of duplicate, simultaneous sampling. The plant was started up according to standard procedures as outlined in Example I so that ethylbenzene was produced. After the initial line-out, wet benzene, approximately 10% of the total benzene charged, was charged directly to the chamber along with the boron trifluoride charge. Chemical analysis of the charge before the hydrogen value removal agent indicated the presence of acidic materials. Chemical analysis of the charge after the hydrogen value removal agent chamber indicated substantial removal of the acidic material and the presence of molecular hydrogen. An ethylene conversion of from about 93 to about 98% per pass was achieved during the 201.5 hours of the test period the chamber containing the hydrogen value removal agent was utilized. The hydrogen value removal agent was then by-passed and a precipitous decline in conversion to about 81% and continued decline to 76.5% during the next 28 hours was recorded. The hydrogen value removal agent, namely aluminum, was placed back on stream and ethylene conversion increased to about 86% during the remaining 156 hours of the run. The run was discontinued after it became apparent that the hydrogen value removal agent was successful in removing hydrogen values from the various reaction atmospheres prior to the alkylation zone.

*Example III*

This example illustrates the substantial removal of the hydrogen values during the production of an alkylated aromatic compound. The same processing unit described in the preceding examples is utilized for the experiment described in this example.

The process flow scheme is modified so that a chamber containing aluminum amalgamated with a mercury promoter, namely metallic mercury, is introduced before the inlet of the alkylation reactor. The sampling system utilized in the preceding example is utilized to test the accuracy of the analytical procedures by means of duplicate, simultaneous sampling. Chemical analysis of the substantially anhydrous charge before the hydrogen value removal agent indicates the presence of acidic materials. Chemical analysis of the fluid after the hydrogen value removal agent indicates substantial removal of acidic materials occurring and molecular hydrogen being liberated.

The overall efficiency of the alkylation process is maintained at the desired level with the chamber containing the aluminum metal amalgamated with metallic mercury in place as evidenced by the continuous production of ethylbenzene until the plant is shut down at the completion of the run.

Similar results are also obtained when zinc and magnesium are utilized as removal agents in systems containing hydrogen values.

I claim as my invention:

1. In the reaction of aromatic and olefin-acting reactants with each other at alkylating conditions in the presence of boron fluoride and a boron fluoride-modified, substantially anhydrous inorganic oxide, said reactants being contaminated with compounds containing hydrogen which can react to form acidic materials, the improvement which comprises contacting the reactants with a metal selected from the group consisting of aluminum, zinc, magnesium, iron and chromium at conditions to convert said hydrogen-containing compounds to molecular hydrogen.

2. The improvement of claim 1 further characterized in that said metal is aluminum.

3. The improvement of claim 1 further characterized in that said metal is zinc.

4. The improvement of claim 1 further characterized in that said metal is magnesium.

5. The improvement of claim 2 further characterized in that said aluminum is amalgamated with a mercury promoter.

6. In the reaction of aromatic and olefinic hydrocarbons with each other at alkylating conditions in the presence of boron fluoride and boron fluoride-modified, substantially anhydrous alumina, said hydrocarbons being contaminated with compounds containing hydrogen which can react to form acidic materials, the improvement which comprises contacting the hydrocarbons with a metal selected from the group consisting of aluminum, zinc, magnesium, iron and chromium at conditions to convert said hydrogen-containing compounds to molecular hydrogen.

7. The improvement of claim 6 further characterized in that said metal is aluminum.

8. The improvement of claim 6 further characterized in that said metal is zinc.

9. The improvement of claim 6 further characterized in that said metal is magnesium.

10. The improvement of claim 7 further characterized in that said aluminum is amalgamated with a mercury promoter.

References Cited by the Examiner

UNITED STATES PATENTS

| | | | |
|---|---|---|---|
| 2,192,015 | 2/40 | Nieuwland et al. | 260—615 |
| 2,745,887 | 5/56 | Pines et al. | 260—668 |
| 2,754,339 | 7/56 | Pines | 260—668 |
| 2,939,890 | 6/60 | Hervert et al. | 260—671 |

OTHER REFERENCES

Sowa, J. Am. Chem. Soc., vol. 57, pp. 454–6 (1935).

ALPHONSO D. SULLIVAN, *Primary Examiner.*